(12) United States Patent
Kuperman et al.

(10) Patent No.: US 7,964,524 B2
(45) Date of Patent: *Jun. 21, 2011

(54) HYDROCONVERSION MULTI-METALLIC CATALYST AND METHOD FOR MAKING THEREOF

(75) Inventors: Alexander E. Kuperman, Orinda, CA (US); Theodorus Maesen, Richmond, CA (US); Dennis Dykstra, Pinole, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 48 days.

This patent is subject to a terminal disclaimer.

(21) Appl. No.: 12/432,719

(22) Filed: Apr. 29, 2009

(65) Prior Publication Data

US 2010/0279854 A1   Nov. 4, 2010

(51) Int. Cl.
  B01J 27/04    (2006.01)
  B01J 27/045   (2006.01)
  B01J 27/047   (2006.01)
  B01J 27/051   (2006.01)
  B01J 27/049   (2006.01)
  B01J 31/00    (2006.01)

(52) U.S. Cl. ........ 502/220; 502/216; 502/219; 502/221; 502/152; 502/168; 502/170; 502/208; 502/209; 502/211; 502/213; 502/223

(58) Field of Classification Search .................. 502/216, 502/219, 220, 221, 222, 223, 152, 168, 170, 502/208, 209, 211, 213
See application file for complete search history.

(56) References Cited

U.S. PATENT DOCUMENTS

| | | | |
|---|---|---|---|
| 3,640,817 A * | 2/1972 | O'Hara ........................... 208/59 |
| 3,673,079 A | 6/1972 | Mulaskey et al. |
| 3,709,814 A | 1/1973 | Jaffe |
| 3,795,632 A | 3/1974 | Morgan at al. |
| 4,003,851 A | 1/1977 | Ebel et al. |
| 4,226,742 A | 10/1980 | Bearden et al. |
| 4,328,127 A * | 5/1982 | Angevine et al. ............. 502/219 |
| 4,422,960 A * | 12/1983 | Shiroto et al. ................ 502/206 |
| 4,430,442 A | 2/1984 | Sawyer et al. |
| 4,508,847 A | 4/1985 | Chianelli et al. |
| 4,540,481 A | 9/1985 | Sawyer et al. |
| 4,542,121 A | 9/1985 | Mitchell et al. |
| 4,579,728 A | 4/1986 | Schoenthal et al. |
| 4,595,672 A | 6/1986 | Ho et al. |
| 4,637,870 A | 1/1987 | Bearden et al. |
| 4,666,878 A | 5/1987 | Jacobson et al. |
| 4,719,002 A | 1/1988 | Mayer et al. |
| 4,721,558 A | 1/1988 | Jacobson et al. |
| 4,740,295 A | 4/1988 | Bearden et al. |
| 4,765,882 A | 8/1988 | Aldridge et al. |
| 4,820,677 A | 4/1989 | Jacobson et al. |
| 4,826,797 A | 5/1989 | Chianelli et al. |
| 4,831,002 A | 5/1989 | Ho et al. |
| 4,836,912 A | 6/1989 | Schlosberg et al. |
| 4,976,848 A | 12/1990 | Johnson |
| 5,026,473 A | 6/1991 | Halbert et al. |
| 5,037,532 A | 8/1991 | Winter et al. |
| 5,039,392 A | 8/1991 | Bearden et al. |
| 5,053,376 A | 10/1991 | Bearden et al. |
| 5,122,258 A | 6/1992 | Eadie et al. |
| 5,162,281 A | 11/1992 | Kamo et al. |
| 5,252,199 A | 10/1993 | Singhal et al. |
| 5,278,121 A | 1/1994 | Singhal et al. |
| 5,300,212 A | 4/1994 | Winter et al. |
| 5,384,336 A | 1/1995 | Koros |
| 5,397,456 A | 3/1995 | Dai et al. |
| 5,648,577 A | 7/1997 | Ho et al. |
| 5,695,632 A | 12/1997 | Brons et al. |
| 5,728,644 A | 3/1998 | Ho et al. |
| 5,767,037 A | 6/1998 | Ho et al. |
| 5,831,138 A | 11/1998 | Ho et al. |
| 5,900,384 A | 5/1999 | Soltani-Ahmadi et al. |
| 5,935,418 A | 8/1999 | Chakrabarty et al. |
| 5,935,421 A | 8/1999 | Brons et al. |
| 5,935,897 A | 8/1999 | Trubenbach et al. |
| 5,977,192 A | 11/1999 | Howsmon et al. |
| 6,030,915 A | 2/2000 | Boer |
| 6,136,180 A | 10/2000 | Benazzi et al. |
| 6,156,695 A | 12/2000 | Soled et al. |

(Continued)

FOREIGN PATENT DOCUMENTS

| EP | 526988 | 6/1992 |
|---|---|---|
| EP | 1169414 | 10/2008 |
| WO | WO 02/04117 | * 1/2002 |

OTHER PUBLICATIONS

Catalysis Today 41 (1998) pp. 207-219 "Surface Area and Pore Structure of Catalysts" by Leofanti et al. Energy & Fuels 2009, 23, pp. 1683-1694 "Atmospheric Residues of Kuwait Heavy Crude Upgrading: A Pilot Plant and Model Simulation Study" by Bahzad et al.
Chemical Engineering Science 62 (2007) pp. 463-470 Drying of wet agglomerates in a continuous fluid bed: Influence of Residence time. air temperature and air flow rate on the drying kinetics and the amount of oversize particles.
"Molecular Weight Distribution in Heavy Crudes" 1998 Paper authored by Boduszynski et al.
Energy & fuels pp. 1065-1071 "Estimation of Total Aromatic Content of Vacuum Gas Oil (VGO) Fractions (370-560 ° C) by 1H NMR Spectroscopy" by Kapur et al., 2005.
PCT Search Report and Written Opinion related to PCT/US2010/030331 dated Dec. 28, 2010.

*Primary Examiner* — Elizabeth D Wood (57) ABSTRACT

A catalyst and a process for making a catalyst from a precursor composition containing rework materials are disclosed. The catalyst is made by sulfiding a catalyst precursor containing 5-95 wt. % rework material. The catalyst precursor employing rework materials can be a hydroxide or oxide material. Rework can be materials generated in the forming or shaping of the catalyst precursor, or formed upon the breakage or handling of the shaped catalyst precursor. Rework can also be in the form of catalyst precursor feed material to the shaping process, e.g., extrusion process, or catalyst precursor material generated as reject or scrap in the shaping process. In some embodiment, rework may be of the consistency of shapeable dough. In another embodiment, rework is in the form of small pieces or particles, e.g., fines, powder.

23 Claims, 1 Drawing Sheet

U.S. PATENT DOCUMENTS

| | | | |
|---|---|---|---|
| 6,162,350 A | 12/2000 | Soled et al. | |
| 6,171,471 B1 | 1/2001 | Ferrughelli et al. | |
| 6,299,760 B1 | 10/2001 | Soled et al. | |
| 6,461,995 B1 | 10/2002 | Addiego et al. | |
| 6,531,516 B2 | 3/2003 | Davis et al. | |
| 6,534,437 B2 | 3/2003 | Eijsbouts et al. | |
| 6,566,296 B2 | 5/2003 | Plantenga et al. | |
| 6,620,313 B1 | 9/2003 | Demmin et al. | |
| 6,635,599 B1 | 10/2003 | Eijsbouts et al. | |
| 6,652,738 B2 | 11/2003 | Eijsbouts et al. | |
| 6,712,955 B1 | 3/2004 | Hou et al. | |
| 6,758,963 B1 | 7/2004 | Hantzer et al. | |
| 6,783,663 B1 | 8/2004 | Riley et al. | |
| 6,919,066 B2 | 7/2005 | Holzle | |
| 7,183,005 B2 | 2/2007 | Poloso et al. | |
| 7,232,515 B1 | 6/2007 | Demmin et al. | |
| 7,288,182 B1 * | 10/2007 | Soled et al. | 208/112 |
| 7,387,983 B2 | 6/2008 | Holzle | |
| 7,507,770 B2 | 3/2009 | Dogterom et al. | |
| 2002/0010088 A1 | 1/2002 | Eijsbouts et al. | |
| 2002/0045539 A1 * | 4/2002 | Kasztelan | 502/222 |
| 2003/0102254 A1 | 6/2003 | Eijsbouts et al. | |
| 2003/0150778 A1 | 8/2003 | Haluska et al. | |
| 2004/0182749 A1 * | 9/2004 | Domokos et al. | 208/213 |
| 2004/0235653 A1 | 11/2004 | Domokos et al. | |
| 2005/0040080 A1 | 2/2005 | Riley et al. | |
| 2006/0060500 A1 * | 3/2006 | Guillaume et al. | 208/108 |
| 2006/0060502 A1 | 3/2006 | Soled et al. | |
| 2006/0060503 A1 | 3/2006 | Soled et al. | |
| 2006/0070915 A1 | 4/2006 | Euzen et al. | |
| 2006/0157386 A1 | 7/2006 | Al-Naeem et al. | |
| 2006/0207917 A1 | 9/2006 | Domokos et al. | |
| 2007/0084754 A1 | 4/2007 | Soled et al. | |
| 2007/0090023 A1 | 4/2007 | Soled et al. | |
| 2007/0090024 A1 | 4/2007 | Soled et al. | |
| 2008/0060977 A1 | 3/2008 | Bhan | |
| 2008/0132407 A1 | 6/2008 | Bai et al. | |
| 2008/0275286 A1 | 11/2008 | Xiao et al. | |
| 2008/0306172 A1 | 12/2008 | Reynhout et al. | |
| 2008/0308462 A1 | 12/2008 | Eijsbouts-Spickova et al. | |
| 2009/0014356 A1 | 1/2009 | Eijsbouts-Spickova et al. | |
| 2009/0057201 A1 | 3/2009 | Brait et al. | |

* cited by examiner

FIGURE 1

HYDROCONVERSION MULTI-METALLIC CATALYST AND METHOD FOR MAKING THEREOF

CROSS-REFERENCE TO RELATED APPLICATIONS

NONE.

TECHNICAL FIELD

The invention relates generally to a hydroprocessing catalyst precursor, processes for preparing the catalyst precursor, multi-metallic catalysts prepared using the catalyst precursor, and hydroconversion processes employing the multi-metallic catalysts.

BACKGROUND

The petroleum industry is increasingly turning to heavy crudes, resids, coals and tar sands, i.e., lower grade hydrocarbon, as sources for feedstocks. The upgrading or refining of these feedstocks is accomplished by treating the feedstocks with hydrogen in the presence of catalysts to effect conversion of at least a portion of the feeds to lower molecular weight hydrocarbons, or to effect the removal of unwanted components, or compounds, or their conversion to innocuous or less undesirable compounds.

Hydroconversion catalysts can be supported or unsupported. Supported catalysts are usually comprised of at least one Group VIB metal with one or more Group VIII metals as promoters on a refractory support, such as alumina. Unsupported mixed Group VIII and Group VIB metal catalysts and catalyst precursors used for hydroconversion processes are known in the art as disclosed in U.S. Pat. Nos. 2,238,851; 5,841,013; 6,156,695; 6,566,296 and 6,860,987, amongst others.

In the process of making and using hydrotreating catalysts, residues and wastes are generated in the form raw and intermediate materials as well as spent catalyst. As the environmental impact of waste disposal from industries has become increasingly scrutinized, there is a need to recycle or rework waste products to the extent possible. As base metals are quite expensive, it is also economical to recycle/reuse rework waste materials. There are a number of references in the prior art disclosing reworking/recycling catalyst products. U.S. Pat. No. 6,030,915 discloses a process for preparing a hydroprocessing catalyst employing ground (spent) regenerated hydroprocessing catalyst. US Patent Publication No. 20080060977 discloses a process to make an oxide catalyst with crushed fines of a fresh catalyst as one of the components.

There is still a need for improved catalysts having the appropriate morphology, structure, and optimum catalytic activity for high yield conversions of lower grade hydrocarbon feedstocks to higher value products. There is also a need for improved processes for making catalysts, particularly environmentally friendly processes that reuse or recycle waste products generated in the process of making catalysts.

SUMMARY OF THE INVENTION

In one aspect, the invention relates to a method for using rework material generated in the process of forming a bulk multi-metallic catalyst, comprising: forming a precipitate comprising at least a promoter metal precursor selected from Group VIII, Group IIB, Group IIA, Group IVA and combinations thereof, at least a Group VIB metal precursor, optionally at least a ligating agent, and optionally at least a diluent; removing at least 50% of liquid from the precipitate by any of decanting, filtering, settling, and drying; adding to the rework material to the precipitate forming a batch mixture; shaping the batch mixture into a shaped catalyst precursor via any of pelletizing, extrusion, tableting, molding, tumbling, pressing, spraying and spray drying; and sulfiding the shaped catalyst precursor forming the bulk multi-metallic catalyst.

In another aspect, the invention relates to bulk multi-metallic catalyst formed from a catalyst precursor having a formula of $(X)_b(MO)_c(W)_d O_z$; wherein X is Ni or Co, the molar ratio of b:(c+d) is 0.5/1 to 3/1, the molar ratio of c: d is >0.01/1, and z=[2b+6 (c+d)]/2, and wherein the catalyst precursor contains 5 to 95 wt. % rework, with rework material comprising materials generated from the drying and shaping of the catalyst precursor.

In a third aspect, the invention relates to bulk multi-metallic catalyst formed from a catalyst precursor containing 5 to 95 wt. % rework, with rework material comprising materials generated from the drying and shaping of the catalyst precursor; wherein the catalyst precursor is of the formula $A_v[(M^P)(OH)_x(L)^n{}_y]_z(M^{VIB}O_4)$, with $M^P$ being a promoter metal compound selected from Group VIII, Group IIB, Group IIA, Group IVA and combinations thereof, $M^{VIB}$ is at least a Group VIB metal compound; L is selected from at least one organic oxygen-containing ligating agent; at least a silicon component; at least an aluminum component; and at least a magnesium component and combinations thereof; A is at least one of an alkali metal cation, an ammonium, an organic ammonium and a phosphonium cation; $M^P:M^{VIB}$ has an atomic ratio of 100:1 to 1:100; $v-2+P*z-x*z+n*y*z=0$; and $0 \leq y \leq -P/n$; $0 \leq x \leq P$; $0 \leq v \leq 2$; $0 \leq z$.

DETAILED DESCRIPTION

The following terms will be used throughout the specification and will have the following meanings unless otherwise indicated.

SCF/BBL (or scf/bbl, or scfb or SCFB) refers to a unit of standard cubic foot of gas ($N_2$, $H_2$, etc.) per barrel of hydrocarbon feed.

LHSV means liquid hourly space velocity.

The Periodic Table referred to herein is the Table approved by IUPAC and the U.S. National Bureau of Standards, an example is the Periodic Table of the Elements by Los Alamos National Laboratory's Chemistry Division of October 2001.

As used here, the term "bulk catalyst" may be used interchangeably with "unsupported catalyst," meaning that the catalyst composition is NOT of the conventional catalyst form which has a preformed, shaped catalyst support which is then loaded with metals via impregnation or deposition catalyst. In one embodiment, the bulk catalyst is formed through precipitation. In another embodiment, the bulk catalyst has a binder incorporated into the catalyst composition. In yet another embodiment, the bulk catalyst is formed from metal compounds and without any binder.

As used herein, the phrases "one or more of" or "at least one of" when used to preface several elements or classes of elements such as X, Y and Z or $X_1$-$X_n$, $Y_1$-$Y_n$ and $Z_1$-$Z_n$, is intended to refer to a single element selected from X or Y or Z, a combination of elements selected from the same common class (such as $X_1$ and $X_2$), as well as a combination of elements selected from different classes (such as $X_1$, $Y_2$ and Zn).

As used herein, "hydroconversion" or "hydroprocessing" is meant any process that is carried out in the presence of hydrogen, including, but not limited to, methanation, water gas shift reactions, hydrogenation, hydrotreating, hydrodesulphurization, hydrodenitrogenation, hydrodemetallation, hydrodearomatization, hydroisomerization, hydrodewaxing and hydrocracking including selective hydrocracking. Depending on the type of hydroprocessing and the reaction conditions, the products of hydroprocessing can show improved viscosities, viscosity indices, saturates content, low temperature properties, volatilities and depolarization, etc.

As used herein, 700° F.+ conversion rate refers to the conversion of an oil feedstock having a boiling point of greater than 700° F.+ to less than 700° F. (371.° C.) boiling point materials in a hydroconversion process, computed as (100%*(wt. % boiling above 700° F. materials in feed—wt. % boiling above 700° F. materials in products)/wt. % boiling above 700° F. materials in feed)).

As used herein, "LD50" is the amount of a material, given all at once, causes the death of 50% (one half) of a group of test animals. LD-50 measures the short-term poisoning potential (acute toxicity) of a material with the testing being done with smaller animals such as rats and mice (in mg/Kg).

Catalyst Product: The catalyst precursor employing rework materials made by the process described herein can be converted into a hydroconversion bulk catalyst (becoming catalytically active) upon sulfidation, e.g., for use in hydrodesulfurization (HDS), hydrodearomatization (HDA), and hydrodenitrification (HDN) processes. The starting material, i.e., catalyst precursor employing rework materials, can be a hydroxide or oxide material, prepared from at least a Promoter metal and a Group VIB metal precursors. The metal precursors can be in either elemental or compound form.

In one embodiment, the catalyst precursor employing rework materials is a bulk multimetallic oxide comprising of at least one Group VIII non-noble material and at least two Group VIB metals. In one embodiment, the ratio of Group VIB metal to Group VIII non-noble metal ranges from about 10:1 to about 1:10. In another embodiment, the oxide catalyst precursor is of the general formula: $(X)_b(MO)_c(W)_dO_z$; wherein X is Ni or Co, the molar ratio of b:(c+d) is 0.5/1 to 3/1, the molar ratio of c: d is >0.01/1, and z=[2b+6 (c+d)]/2. In yet another embodiment, the oxide catalyst precursor further comprises one or more ligating agents L. The term "ligand" may be used interchangeably with "ligating agent," "chelating agent" or "complexing agent" (or chelator, or chelant), referring to an additive that combines with metal ions, e.g., Group VIB and/or Promoter metals, forming a larger complex, e.g., a catalyst precursor.

In another embodiment, the catalyst precursor employing rework materials is a hydroxide compound comprising of at least one Group VIII non-noble material and at least two Group VIB metals. In one embodiment, the hydroxide compound is of the general formula $A_v[(M^P)(OH)_x(L)^n{}_y]_z(M^{VIB}O_4)$, wherein A is one or more monovalent cationic species, M refers to at least a metal in their elemental or compound form, and L refers to one or more ligating agent.

In one embodiment, A is at least one of an alkali metal cation, an ammonium, an organic ammonium and a phosphonium cation. In one embodiment, A is selected from monovalent cations such as NH4+, other quaternary ammonium ions, organic phosphonium cations, alkali metal cations, and combinations thereof.

In one embodiment, L is a ligating agent. In one embodiment, L has a neutral or negative charge n<=0. In one embodiment, L is a non-toxic organic oxygen containing ligating agent with an LD50 rate (as single oral dose to rats) of greater than 500 mg/Kg. The term "charge-neutral" refers to the fact that the catalyst precursor carries no net positive or negative charge. Ligating agents can include both polydentate as well as monodentate, e.g., $NH_3$ as well as alkyl and aryl amines. Other examples of ligating agents L include but are not limited to carboxylates, carboxylic acids, aldehydes, ketones, the enolate forms of aldehydes, the enolate forms of ketones, and hemiacetals, and combinations thereof. The term "carboxylate" refers to any compound containing a carboxylate or carboxylic acid group in the deprotonated or protonated state. In another embodiment, L is selected from the group of organic acid addition salts such as formic acid, acetic acid, propionic acid, maleic acid, malic acid, cluconic acid, fumaric acid, succinic acid, tartaric acid, citric acid, oxalic acid, glyoxylic acid, aspartic acid, alkane sulfonic acids such as methane sulfonic acid and ethane sulfonic acid, aryl sulfonic acids such as benzene sulfonic acid and p-toluene sulfonic acid and arylcarboxylic acids; carboxylate containing compounds such as maleate, formate, acetate, propionate, butyrate, pentanoate, hexanoate, dicarboxylate, and combinations thereof.

$M^P$ is at least a promoter metal. In one embodiment, $M^P$ has an oxidation state of either +2 or +4. $M^P$ is selected from Group VIII, Group IIB, Group IIA, Group IVA and combinations thereof. In one embodiment, $M^P$ is at least a Group VIII metal and $M^P$ has an oxidation state P of +2. In another embodiment, $M^P$ is selected from Group IIB, Group IVA and combinations thereof. In one embodiment, the Promoter metal $M^P$ is at least a Group VIII metal with $M^P$ having an oxidation state of +2 and the catalyst precursor is of the formula $A_v[(M^P)(OH)_x (L)^n{}_y]_z(M^{VIB}O_4)$ to have (v−2+2 z−x*z+n*y*z)=0. In one embodiment, the Promoter metal $M^P$ is a mixture of two Group VIII metals such as Ni and Co. In yet another embodiment, $M^P$ is a combination of three metals such as Ni, Co and Fe. In one embodiment where $M^P$ is a mixture of two group IIB metals such as Zn and Cd, the catalyst precursor is of the formula $A_v[(Zn_aCd_{a'})(OH)_x(L)_y]_z(M^{VIB}O^4)$. In yet another embodiment, $M^P$ is a combination of three metals such as Zn, Cd and Hg, the catalyst precursor is of the formula $A_v[(Zn_aCd_{a'}Hg_{a''})(OH)_x(L)_{n,y}]_z(M^{VIB}O^4)$.

In one embodiment, the Promoter metal $M^P$ is selected from the group of IIB and VIA metals such as zinc, cadmium, mercury, germanium, tin or lead, and combinations thereof, in their elemental, compound, or ionic form. In yet another embodiment, the Promoter metal $M^P$ further comprises at least one of Ni, Co, Fe and combinations thereof, in their elemental, compound, or ionic form. In another embodiment, the Promoter metal is a Group IIA metal compound, selected from the group of magnesium, calcium, strontium and barium compounds which are at least partly in the solid state, e.g., a water-insoluble compound such as a carbonate, hydroxide, fumarate, phosphate, phosphite, sulphide, molybdate, tungstate, oxide, or mixtures thereof.

In one embodiment, $M^{VIB}$ is at least a Group VIB metal having an oxidation state of +6. In one embodiment, $M^P$:$M^{VIB}$ has an atomic ratio between 100:1 and 1:100. v−2+P*z−x*z+n*y*z=0; and $0 \leq y \leq -P/n$; $0 \leq x \leq P$; $0 \leq v \leq 2$; $0 \leq z$. In one embodiment, $M^{VIB}$ is molybdenum. In yet another embodiment, $M^{VIB}$ is a mixture of at least two Group VIB metals, e.g., molybdenum and tungsten.

Methods for Making Hydroprocessing Catalyst Precursor Employing Reworks: The preparation method allows the use of rework, i.e., waste materials obtained from the step(s)

wherein a shaped catalyst precursor is formed, and before the shaped catalyst precursor is sulfided forming a catalyst.

The term "shaped catalyst precursor" means catalyst precursor formed (or shaped) by spray drying, pelleting, pilling, granulating, beading, tablet pressing, bricketting, using compression method via extrusion or other means known in the art or by the agglomeration of wet mixtures. The shaped catalyst precursor can be in any form or shape, including but not limited to pellets, cylinders, straight or rifled (twisted) trilobes, multiholed cylinders, tablets, rings, cubes, honeycombs, stars, tri-lobes, quadra-lobes, pills, granules, etc.

Rework can be scrap/discarded/unused materials generated in any step of the preparation of the catalyst precursor. In one embodiment, rework is generated from any of the forming, drying, or shaping of the catalyst precursor, or formed upon the breakage or handling of the shaped catalyst precursor. Rework can also be in the form of catalyst precursor feed material to the shaping process, e.g., extrusion process, or catalyst precursor material generated as reject or scrap in the shaping or drying process. In some embodiment, rework may be of the consistency of shapeable dough. In another embodiment, rework is in the form of small pieces or particles, e.g., fines, powder. In yet a third embodiment, rework is in the form of wet filter cake from the liquid removal step.

In one embodiment, rework material consists essentially of uncalcined material (non-oxide). In the calcinations step, the catalyst precursor is turned into an oxide. Thus, rework material from calcined precursors typically does not peptize well except under extreme conditions (e.g., very high or low pH), less suitable for recycling/re-use. In order to compensate for the oxide rework material, the fresh extrusion mix can be over-peptized, resulting in collapse of the pores and subsequent low catalytic activity.

In another embodiment, rework material consists essentially of catalyst precursors made without the use of alumina and/or silica alumina diluent. The incorporation of rework materials containing alumina and/or silica alumina diluent may result in a sulfided catalyst with lower than expected catalytic activities.

In one embodiment, the amount of rework used in forming shaped catalyst precursor ranges from 5 to 95 wt. %, with the remainder being the fresh ingredients. In a second embodiment, the amount of rework ranges from 10 to 70 wt. %. In a third embodiment, from 15 to 45%.

In one embodiment, a sufficient amount of rework is employed for an extrusion mix having 50 to 90% solids, as measured using the loss on ignition (LOI) test.

In another embodiment, a sufficient amount of rework is added to the fresh material for the mix to have a 55-75% solids (100%−LOI). In a third embodiment, a sufficient amount of rework is employed for an extrusion mix of 60-70% solids (100%−LOI). LOI is an analytical test, consisting of strongly heating (igniting or calcining) a material sample at a sufficiently high temperature (e.g., from 500 to 1000° C.), allowing volatile substances to escape until its mass ceases to change (from 15 minutes to 8 hours). LOI is determined according to the formula: LOI %=(w−$w_{calc}$)/w*100%. $w_{calc}$ is the weight of the calcined sample after heating, w is the original weight before heating.

Figure 1:
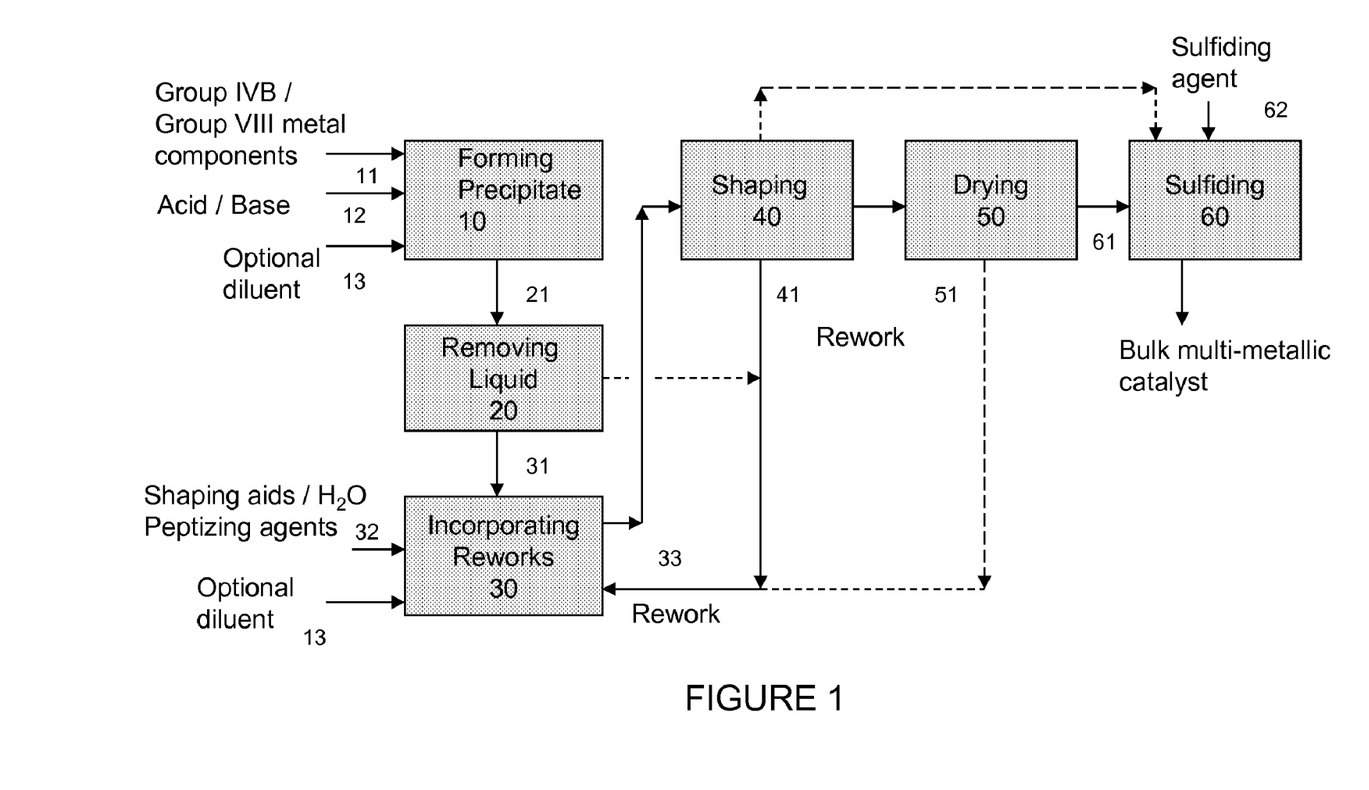
FIG. 1 is block diagram showing an embodiment of a process for making a multi-metallic catalyst incorporating rework materials.

Reference will be made to FIG. 1 to further illustrate embodiments of the invention. FIG. 1 is a block diagram schematically illustrating an embodiment of a general process for making a multi-metallic catalyst employing rework materials.

Forming a Precipitate or Cogel: In one embodiment, step 10 in the process is a precipitation or cogellation step to form one of the fresh ingredients, which involves reacting in a mixture of the metal precursors 11, e.g., Promoter metal component(s) and the Group VIB metal component to obtain a precipitate or cogel. The term "cogel" refers to a co-precipitate (or precipitate) of at least two metals. The metal precursors can be added to the reaction mixture as a solid, in solution, suspension, or a combination thereof. If soluble salts are added as such, they will dissolve in the reaction mixture and subsequently be precipitated or cogeled, or forming a suspension. The solution can be heated optionally under vacuum to effect precipitation and evaporation of liquid.

The precipitation (or cogelation) is carried out at a temperature and pH which the Promoter metal compound and the Group VIB metal compound precipitate or form a cogel. In one embodiment, the temperature at which the cogel is formed is between 25-350° C. In one embodiment, the catalyst precursor is formed at a pressure between 0 to 3000 psig. In a second embodiment, between 10 to 1000 psig. In a third embodiment, between 30 to 100 psig. The pH of the mixture can be changed to increase or decrease the rate of precipitation or cogelation' depending on the desired characteristics of the product. In one embodiment, the mixture is left at its natural pH during the reaction step(s). In another embodiment' the pH is maintained in the range of 0-12. In another embodiment, the pH is maintained in the range of 7-10. Changing the pH can be done by adding base or acid 12 to the reaction mixture, or adding compounds, which decompose upon temperature increase into hydroxide ions or $H^+$ ions that respectively increase or decrease the pH. In another embodiment, adding compounds which participate in the hydrolysis reaction. Examples of compounds to be added for pH adjustment include but are not limited to urea, nitrites, ammonium hydroxide, mineral acids, organic acids, mineral bases, and organic bases.

In one embodiment, at least a ligating agent L can be optionally added prior to or after precipitation or cogelation of the promoter metal compounds and/or Group VIB metal compounds, i.e., the ligating agent L can be added to the metal precursors as one of the reagents forming the precipitate, or it can be added after the precipitate is formed.

In one embodiment, instead of or in addition to the ligating agent L, diluent amounts from 5-95 wt. % of the total composition of the catalyst precursor can also be added to this step, depending on the envisaged catalytic application. These materials can be applied before or after the precipitation or cogelation of the metal precursors. Examples of diluent materials include zinc oxide; zinc sulfide; niobia; tetraethyl orthosilicate; silicic acid; titania; titania; silicon components such as sodium silicate, potassium silicate, silica gels, silica sols, silica gels, hydronium- or ammonium-stabilized silica sols, and combinations thereof, aluminum components useful in the process of the present invention include, but are not limited to, sodium aluminate, potassium aluminate, aluminum sulfate, aluminum nitrate, and combinations thereof, magnesium components such as magnesium aluminosilicate clay, magnesium metal, magnesium hydroxide, magnesium halides, magnesium sulfate, and magnesium nitrate; zirconia; cationic clays or anionic clays such as saponite, bentonite, kaoline, sepiolite or hydrotalcite, or mixtures thereof. In one embodiment, titania is used as a diluent in an amount of greater than 50 wt. %, on a final catalyst precursor basis (as an oxide or hydroxide).

Liquid Removal: In the next step 20, at least 50 wt. % of liquid (supernatant/water) is removed from the precipitate (or suspension) via separation processes known in the art, e.g., filtering, settling, decanting, centrifuging, etc. In one embodiment, liquid in the precipitate is removed via filtration with vacuum techniques or equipment known in the art, giving a wet filter cake 31. A wet filter cake is generally defined as filter cake having approximately 10 to 50 wt. % liquid, thus being generally free of water or other solvent such as methanol and the like.

In one embodiment, optional drying of the wet filter cake is performed under atmospheric conditions or under an inert atmosphere such as nitrogen, argon, or vacuum, and at a temperature sufficient to remove water but not removal of organic compounds. In one embodiment, optional drying is performed at about 50-120° C. until a constant weight of the catalyst precursor is reached. In another embodiment, the drying is done at a temperature between 50° C. to 200° C. for a period ranging from ½ hour to 6 hours. Drying can be done via thermal drying techniques known in the art, e.g., flash drying, belt drying, oven drying, etc.

Incorporating Rework Material: In this step 30, rework material 33 in the form of extrudable dough and/or dry particles/pieces is mixed together with water and fresh material, i.e., filter cake or dried catalyst precursor from the previous step, and other materials including but not limited to optional shaping aid, optional peptizing agents, optional pore forming agents, and optional diluent materials.

The mixture is mixed for a sufficient period of time to obtain a mixture that is substantially uniform or homogeneous. The mixing time depends on the type and efficiency of the mixing technique, e.g., milling, kneading, slurry mixing, dry or wet mixing, or combinations thereof and the mixing apparatus used, e.g., a pug mill, a blender, a double-arm kneading mixer, a rotor stator mixer, or a mix muller. In one embodiment, the mixing time ranges from 0.1 to 10 hours.

In one embodiment, either the rework material in the form of dry material and/or mixture of rework material and dried catalyst precursor is reduced in particle size before being mixed with other materials. In one embodiment, the grinding takes place in a jet or hammer mill to reduce the particle size to below 150 μm in one embodiment and below 50 μm in another embodiment.

In one embodiment, rework material 33 is mixed together with the filter cake material 31 and at least a shaping aid 32 (can also be sometimes referred to as "binder") that act as both a binder for the mixture, and a source of plasticity and lubricity for the shaping process. In one embodiment, the shaping aid material is added in a ratio of between 100:1 and 10:1 (wt. % catalyst precursor to wt. % shaping aid). In one embodiment, the shaping aid material is selected an organic binder of the cellulose ether type and/or derivatives. Examples include methylcellulose, hydroxybutylcellulose, hydrobutyl methylcellulose, hydroxyethylcellulose, hydroxymethylcellulose, hydroxypropylcellulose, hydroxypropyl methylcellulose, hydroxyethyl methylcellulose, sodium carboxy methylcellulose, and mixtures thereof. In another embodiment, the shaping aid is a polyakylene glycol such as polyethylene glycol (PEG). In yet another embodiment, shaping aids are selected from saturated or unsaturated fatty acid (such as politic acid, satiric acid or oleic acid) or a salt thereof, a polysaccharide derived acid or a salt thereof, graphite, starch, alkali stearate, ammonium stearate, stearic acid, mineral oils, and combinations thereof.

In one embodiment, a peptizing agent may be added to the mixture along with the rework materials. The peptizing agent may be an alkali or an acid, e.g., ammonia, formic acid, citric acid, nitric acid, maleic acid, carboxylic acid, etc. In one embodiment whether the catalyst precursor material is to be spray-dried, ammonia solution from 10 to 28% strength can be added in amounts of from 50 to 150 ml per 100 g of spray-dried material. In another embodiment, acids can be employed in the form of aqueous solutions of from 2 to 4% strength, in amounts of from 10 to 20 ml per 100 g of spray-dried material. The amount of peptizing agent required depends on the intensity of mixing, the amount of rework material added to the mixture, and the granulation time.

In another embodiment, a pore forming agent is also added to the mixture along with the rework. Examples of pore forming agents include but are not limited to mineral oils, steric acid, polyethylene glycol polymers, carbohydrate polymers, methacrylates, cellulose polymers, and carboxylates which decompose upon being heated. Examples of commercially available cellulose based pore forming agents include but are not limited to: Methocel™ (available from Dow Chemical Company), Avicel™ (available from FMC Biopolymer), Morwet™ (from Witco) and Porocel™ (available from Porocel).

In yet another embodiment, diluent materials 13 can be optionally added to the mixture along with the rework. The diluent materials added in this step can be the same as or different from any diluent materials that may have been added to the step of forming the precipitate from metal precursors as described above.

Shaping Process: In this step, the catalyst precursor incorporating rework material is shaped into formed particles, such as spheroids, pills, tablets, cylinders, pellets, irregular extrusions, loosely bound aggregates or clusters, etc., using any of the methods known in the art including but not limited to pelletizing, extrusion, tableting, molding, tumbling, pressing, spraying and spray drying.

In one embodiment, a shaped catalyst precursor is formed via extrusion, using extrusion equipment known in the art, e.g., single screw extruder, ram extruder, twin-screw extruder, etc. In another embodiment, the shaping is done via spray drying at an outlet temperature ranging from 100° C. to 320° C. In one embodiment, shaped catalyst precursor is extruded into extrudate having a diameter from about 1/16 to 1/8 of an inch. After extrusion the extrudate can be cut to suitable lengths, e.g., 1/16-inch to 5/16-inch, to produce cylindrical pellets.

In the shaping/drying process, rework can be generated in the form of powder material (fines) waste 51 from spray drying, or waste paste, extrudable dough material 41 from extrusion, pelletizing, etc. The rework material can be recycled forming a new mix batch for subsequent shaping.

In one embodiment wherein the catalyst precursor is spray dried, the mixture incorporating the rework material is first reslurried in water before spray drying. In the spray drying step, the batch containing rework material is transformed into dry powder in a continuous single step operation with the use of hot air entering the chamber from an air disperser. The spray dried catalyst precursor discharged from the drying chamber can go directly to the sulfiding step.

In one embodiment wherein the catalyst precursor is to be shaped via pelletizing, extrusion, or pressing, a sufficient amount of water is added to the mixing batch to adjust the batch viscosity to a convenient level for plasticizing and shaping, i.e., a mixture of dough consistency. In one embodiment, a sufficient amount of water is added for the mixture to have between 50 to 90% solids (LOI). In another embodiment, between 60 to 70% solids (LOI).

Drying/Calcining Step: In one embodiment, the shaped catalyst precursor is air (or nitrogen) dried in a directly or indirectly heated oven, tray drier, or belt drier at about 50° C. to 320° C. for about 15 minutes to 24 hours. In one embodiment, the shaped catalyst precursor is dried at a temperature from 90 to 150° C. In the drying process, some rework can be generated as fine powder or small pieces upon the breakage or handling of the shaped catalyst precursor, and can be recycled upon mixing with new/fresh ingredients. In one embodiment, the drying is at a temperature at or below 100° C. In one embodiment, the catalyst precursor is nitrogen stable. As used herein, the term nitrogen stable means that the properties (after the catalyst precursor is sulfided to form a catalyst) are not affected by the drying agent, i.e., whether drying in a nitrogen or oxygen environment.

In one embodiment, the catalyst precursor after drying can go directly to the sulfiding step. In another embodiment, the shaped catalyst is optionally calcined at a temperature in the range of about 350° C. to 750° C. in a suitable atmosphere, e.g., inerts such as nitrogen or argon, or steam. In yet another embodiment, the calcination is carried out at a temperature between 350° C. to 600° C. In the calcination process, the catalyst precursor gets converted into an oxide.

Sulfiding Step: The shaped catalyst precursor containing rework material 61 can be sulfided to form an active catalyst, with the use of at least a sulfiding agent 62 selected from the group of: elemental sulfur by itself, a sulfur-containing compound which under prevailing conditions, is decomposable into hydrogen sulphide; $H_2S$ by itself or $H_2S$ in any inert or reducing environment, e.g., $H_2$. Examples of sulfiding agents include ammonium sulfide, ammonium polysulfide ($[(NH_4)_2S_x]$), ammonium thiosulfate (($NH_4)_2S_2O_3$), sodium thiosulfate $Na_2S_2O_3$), thiourea $CSN_2H_4$, carbon disulfide, dimethyl disulfide (DMDS), dimethyl sulfide (DMS), dibutyl polysulfide (DBPS), mercaptanes, tertiarybutyl polysulfide (PSTB), tertiarynonyl polysulfide (PSTN), and the like. In one embodiment, hydrocarbon feedstock is used as a sulfur source for performing the sulfidation of the catalyst precursor.

The sulfiding step can be carried out prior to introduction of the catalyst into a hydrotreating reactor (thus ex-situ sulfiding). Sulfidation of the catalyst precursor by a hydrocarbon feedstock can be performed in one or more hydrotreating reactors during hydrotreatment (in-situ sulfiding).

In the sulfiding step, shaped catalyst precursor containing rework is converted into an active catalyst upon contact with the sulfiding agent at a temperature ranging from 25° C. to 500° C., from 10 minutes to 15 days, and under a $H_2$-containing gas pressure. The total pressure during the sulfidation step can range between atmospheric to about 10 bar (1 MPa). If the sulfidation temperature is below the boiling point of the sulfiding agent, the process is generally carried out at atmospheric pressure. Above the boiling temperature of the sulfiding agent/optional components (if any), the reaction is generally carried out at an increased pressure.

Use of The Catalyst: A multi-metallic catalyst prepared from the catalyst precursor composition employing rework material can be used in virtually all hydroprocessing processes to treat a plurality of feeds under wide-ranging reaction conditions such as temperatures of from 200 to 450° C., hydrogen pressures of from 15 to 300 bar, liquid hourly space velocities of from 0.05 to 10 h$^{-1}$ and hydrogen treat gas rates of from 35.6 to 2670 m$^3$/m$^3$ (200 to 15000 SCF/B—or "Standard Cubic Feet per Barrel" of hydrocarbon compound feed to the reactor). The catalyst with rework material is also characterized by excellent catalytic activity, as giving an almost full HDN conversion rate (>99.99%) in the hydrotreating of heavy oil feedstock such as VGO.

The catalyst prepared from the precursor material incorporating rework also has other desirable properties, as demonstrated with the precursor having a compact bulk density (CBD) of at most 1.6 g/cc, a surface area measured by the BET method, using nitrogen as adsorbate, in the range of 40 to 300 m$^2$/g in one embodiment, and above 250 m$^2$/g in another embodiment; a crush strength of at least about 2.5 lbs; and an attrition loss of less than 7 wt. %. Attrition loss is the loss to fine amount measured when tumbled one-half hour in a rotating drum. Pore volume measured using nitrogen adsorption up to 95 nm on the BET adsorption curve of 0.002 to 2.0 cm$^3$/g. In one embodiment, the pore volume is less than 1.0 cm$^3$/g. In a one embodiment, the CBD is at most 1.4 g/cc. In yet another embodiment, the CBD is at most 1.2 g/cc. In one embodiment, the crush strength is at least 6 lbs. In one embodiment, the catalyst precursor has a particle density of equal or less 2.5 g/cc. In another embodiment, the particle density is equal or less than 2.2 g/cc.

It should be appreciated that the methods of using rework in making a catalyst precursor as illustrated above can be varied without departing from the essential characteristics of the invention. For example, the step of incorporating rework materials into fresh ingredients, e.g., dried catalyst precursor material, diluents, binders, etc., can be combined with the shaping step with the use of appropriate equipment such as a multi-staged extruder with multiple feed inlets. Additionally, there is no particularly order for mixing the materials (in solid and/or liquid form) together. Sulfidation can be carried out any time after the shaping step, e.g., prior to the drying/calcining step, which in that case, the drying/calcining step can be omitted.

EXAMPLES

The following illustrative examples are intended to be non-limiting.

Example 1

Ni—Mo—W-Maleate Catalyst Precursor

A catalyst precursor of the formula $(NH_4)\{[Ni_{2.6}(OH)_{2.08}(C_4H_2O_4^{2-})_{0.06}](Mo_{0.35}W_{0.65}O_4)_2\}$ was prepared as follows: 52.96 g of ammonium heptamolybdate $(NH_4)_6Mo_7O_{24}\cdot4H_2O$ was dissolved in 2.4 L of deionizer water at room temperature. The pH of the resulting solution was within the range of 5-6. 73.98 g of ammonium metatungstate powder was then added to the above solution and stirred at room temperature until completely dissolved. 90 ml of concentrated $(NH_4)OH$ was added to the solution with constant stirring. The resulting molybdate/tungstate solution was stirred for 10 minutes and the pH monitored. The solution had a pH in the range of 9-10. A second solution was prepared containing 174.65 g of $Ni(NO_3)_2\cdot6H_2O$ dissolved in 150 ml of deionized water and heated to 90° C. The hot nickel solution was then slowly added over 1 hr to the molybdate/tungstate solution. The resulting mixture was heated to 91° C. and stirring continued for 30 minutes. The pH of the solution was in the range of 5-6. A blue-green precipitate formed and the precipitate was collected by filtration. The precipitate was dispersed into a solution of 10.54 g of maleic acid dissolved in 1.8 L of DI water and heated to 70° C. The resulting slurry was stirred for 30 min. at 70° C., filtered, and the collected precipitate vacuum dried at room temperature overnight. The BET Surface area of the resulting material was 101 m$^2$/g, the average pore volume was around 0.12-0.14 cc/g, and the average pore size was around 5 nm.

Example 2

Co—Mo—W-maleate Catalyst Precursor

A catalyst precursor of the formula $(NH_4)\{[CO_{3.0}(OH)_{3.0-c}(C_4H_2O_4^{2-})_{c/2}](Mo_{0.34}W_{0.66}O_4)_2\}$ was prepared as follows: 2.0 g of maleic acid was dissolved in 800 g of deionized water at room temperature. The pH of the resulting solution was within the range of 2-3. 17.65 g of ammonium heptamolybdate $(NH_4)_6Mo_7O_{24} \cdot 4H_2O$ powder was dissolved in the above solution, followed by addition of 24.67 g of ammonium metatungstate $(NH_4)_6H_2W_{12}O_{40} \cdot xH_2O$ (>66.5% W). The pH of the resulting solution was within the range of 4-5. 30 ml of concentrated $(NH_4)OH$ was added to the solution with constant stirring. The resulting molybdate/tungstate solution was stirred for 10 minutes and the pH monitored. The solution had a pH in the range of 9-10 at room temperature and was heated to 90° C. A second solution was prepared containing 58.28 g of cobalt nitrate dissolved in 50 g of deionized water. The hot cobalt solution was then slowly added over 25 min to the hot molybdate/tungstate solution. The resulting mixture was continuously stirred at 90° C. for 1 hour. The pH of the solution was around 6. A dark purplish brown precipitate that formed in the process was collected by filtration. The precipitate was dispersed into 250 g of DI water at 70° C. The resulting slurry was stirred for 30 min., filtered, and the collected precipitate vacuum dried at room temperature overnight. The material was then further dried at 120° C. for 12 hr.

Example 3

Co—Mo—W Catalyst Precursor

A catalyst precursor of the formula $(NH_4)^+\{[CO_{3.31}(OH)_{3.62}] (Mo_{0.3}W_{0.7}O_4)_2\}$ was prepared according to the following procedure: 17.65 g of ammonium heptamolybdate $(NH_4)_6 Mo_7O_{24} \cdot 4H_2O$ powder was dissolved in 800.00 g of deionized water at room temperature followed by addition of 24.66 g of ammonium metatungstate $(NH_4)_6 H_2W_{12}O_{40} \cdot xH_2O$ (>66.5% W). The pH of the resulting solution was within the range of 5.2-5.4. A second solution was prepared containing 58.26 g of cobalt nitrate hexahydrate dissolved in 50.0 g of deionized water. The pH of the resulting solution was within the range of 1-2. 30 ml of concentrated $(NH_4)OH$ was added to the solution with constant stirring. Initially moss green in color precipitate was formed later turning into a 2 layer mixture with a greenish suspension at the bottom and a top brownish layer. The cobalt containing mixture was then slowly added over 25 min to the molybdate/tungstate solution at room temperature. The pH of the resulting solution was within the range of 8-8.5. The mixture was heated to 80° C. and continuously stirred for 1 hour. A purplish grey suspension was filtered while hot. The precipitate was dispersed into 2.5 L of DI water at 70° C. The resulting slurry was stirred for 30 min (pH7.6), filtered, and the collected precipitate vacuum dried at room temperature overnight. The material was then further dried at 120° C. for 12 hr.

Example 4

Extrusion Process

In this example, 40 g of dried catalyst precursor prepared as per examples 1-3 was mixed with 0.8 g of methocel, (a commercially available methylcellulose and hydroxypropyl methylcellulose polymer from Dow Chemical Company), and approximately 7 g of DI water was added. Another 7 g of water was slowly added until the mixture was of an extrudable consistency.

The mixture was extruded using any of a double barrel Wolf extruder with a 27½" screw and full-length of 33½"; a Loomis 232DT extruder; and a 2" extruder with packer from the Bonnot company with a 1/16" die holes. Some of the extrudate was cut into pellets with length of about ⅛" to ½". Some of the extrudate was reserved for subsequent reuse as "rework."

Example 5

Drying Process

The precursor pellets were dried under $N_2$ at 120° C. prior to sulfiding. Some of the dry pellets were reserved for subsequent reuse as "rework."

Example 6

Catalyst Precursors with Rework Extrudate

For each batch, 30 g of dried (fresh) catalyst precursor prepared as per examples 1-3 was mixed with 10 g of rework material (dough like material) from example 4, and about 0.7 g of methocel and 7 g of DI water. Another 5-10 g of water was slowly added to the mixture until it is of an extrudable consistency. The mixture incorporating rework was extruded using a Wolf extruder with a 1/16" die holes. The extrudate was subsequently cut into pellets and dried before sulfidation.

Example 7

Catalyst Precursors with Rework Dry Powder

For each batch, 30 g of dried (fresh) catalyst precursor prepared as per examples 1-3 was mixed with 5 g of rework extrudate material from example 4, 5 g of rework dry powder from example 5, and about 0.7 g of methocel and about 8-10 g of DI water. Additional water was added to give the batch mixture the consistency required for the particular shaping process employed, e.g., extrusion, pelletizing, etc. The rework pellets after drying in example 5 was first reduced in size using a ball mill or an agitated media mill prior to being mixed into the batch mixture containing the fresh ingredients.

Example 8

Sulfidation DMDS Liquid Phase

Sulfided catalysts were prepared from the three batches of catalyst precursor pellets of examples 1-3 as prepared: A) without any rework material (example 5); B) with rework extrudate in an amount of about 25% (example 6); and C) with rework material in both extrudate and dry powder form (example 7).

The precursors are placed in a tubular reactor. The temperature is raised from room temperature to 250° F. at a rate of 100° F./hr under $N_2(g)_a$ t 8 ft$^3$/hr. The reaction continues for 1 hour after which time the $N_2$ is switched off and replaced with $H_2$ at 8 ft$^3$/hr and 200 psig for 1 hour. Light VGO oil (end point below 950° F.) is pumped over the catalyst precursor at 250° F. at a rate of 130 cc/hr (1 LHSV) while the hydrogen gas rate at 8 cubic feet an hour is maintained. The catalyst precursor is then heated to 430° F. at a rate of 25° F./hr and dimethyl disulfide (DMDS) is added to the light VGO at a rate of 4 cc/hr for approximately 4 hr. The catalyst precursor is then heated to 600° F., and the rate of DMDS addition increases to 8 cc/hr.

The temperature is maintained at 600° F. for 2 hours after which time sulfidation was complete.

Example 9

Comparison Study

In this example, catalysts prepared from precursors with and without rework were compared with respect to hydrocracking, HDS, and HDN activity using a heavy oil feedstock with a boiling point above 700° F., a sulfur content of 31135 ppm, a nitrogen content of 31230 ppm, and other properties as presented in Table 1. The reactor conditions include a pressure of 2300 psi, an $H_2$ gas rate of 5000 SCFB, and an LHSV of 0.75.

Catalysts prepared from precursors containing rework materials gave comparable performance as compared with catalysts prepared from precursors without any rework material, including converting 700° F.+product to less than 1 ppm-wt N.

TABLE 1

| Properties | VGO Feedstock |
|---|---|
| API Gravity | 20.0 |
| N, ppm | 1100 |
| S, wt % | 2.72 |
| Carbon, wt % | 85.6 |
| 22 compounds | |
| Aromatics, vol % | 35.0 |
| Naphthenes, vol % | 27.8 |
| Paraffins, vol % | 13.5 |
| Sulfur compounds, vol % | 23.7 |
| Simdist, wt % | |
| 0.5/5 | 640/689 |
| 10/30 | 717/800 |
| 50/ | 866 |
| 70/90 | 930/1013 |
| 95/99 | 163/1168 |

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present invention. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items.

This written description uses examples to disclose the invention, including the best mode, and also to enable any person skilled in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

The invention claimed is:

1. A method for using rework material generated in the process of forming a bulk multi-metallic catalyst, the method comprising:
   forming a precipitate comprising at least a promoter metal precursor, at least a Group VIB metal precursor, optionally at least a ligating agent, and optionally at least a diluent, wherein the promoter metal precursor is selected from Group VIII, Group IIB, Group IIA, Group IVA and combinations thereof, wherein the precipitate is a hydroxide;
   removing at least 50% of liquid from the precipitate by any of decanting, filtering, settling, and drying;
   adding the rework material to the precipitate forming a batch mixture, wherein the rework is a hydroxide;
   shaping the batch mixture into a shaped catalyst precursor via any of pelletizing, extrusion, tableting, molding, tumbling, pressing, spraying and spray drying; and
   sulfiding the shaped catalyst precursor forming the bulk multi-metallic catalyst;
   wherein the steps before sulfiding are carried out at a temperature of 200° C. or less and wherein the catalyst precursor remains a hydroxide before sulfiding.

2. The method of claim 1, wherein the rework material comprises 5 to 95 wt. % of the batch mixture.

3. The method of claim 2, wherein the rework material comprises 15 to 45 wt. % of the batch mixture.

4. The method of claim 1, wherein a sufficient amount of water is added to the batch mixture to have between 50 to 90% solids.

5. The method of claim 4, wherein a sufficient amount of water is added to the batch mixture to have between 60 to 70% solids.

6. The method of claim 1, further comprising drying the shaped catalyst precursor containing rework material at a temperature ranging from 50° C. to 325° C. for about 15 minutes to 24 hours prior to the sulfiding step.

7. The method of claim 1, wherein the rework material consists essentially of particles or pieces generated from the drying step.

8. The method of claim 1, wherein the batch mixture is shaped into a shaped catalyst precursor by extrusion, and where the rework material consists essentially of extrudable dough generated from the extrusion step.

9. The method of claim 1, wherein the rework material is a mixture of particles or pieces generated from the drying step and extrudable dough generated from the shaping step.

10. The method of claim 1, wherein at least a shaping aid is added to the rework material and the precipitate to form the batch mixture, and wherein the shaping aid is added in a ratio of between 10:1 to 100:1 of final weight of batch mixture to shaping aid.

11. The method of claim 10, wherein the shaping aid is selected from the group of methylcellulose, hydroxybutylcellulose, hydrobutyl methylcellulose, hydroxyethylcellulose, hydroxymethylcellulose, hydroxypropylcellulose, hydroxypropyl methylcellulose, hydroxyethyl methylcellulose, sodium carboxy methylcellulose, mineral oil, polyakylene glycol, saturated fatty acids, unsaturated fatty acids, polysaccharide derived acids or salts thereof, graphite, starch, alkali stearate, ammonium stearate, stearic acid, and combinations thereof.

12. The method of claim 1, wherein at least a peptizing agent is added to the rework material and the precipitate to form the batch mixture, and wherein the peptizing agent is selected from the group of ammonia, formic acid, citric acid, nitric acid, carboxylic acid, and combinations thereof.

13. The method of claim 1, wherein at least a pore forming is added to the rework material and the precipitate to form the batch mixture, and wherein the pore forming is selected from the group of steric acid, polyethylene glycol polymers, carbohydrate polymers, methacrylates, cellulose polymers, and combinations thereof.

14. The method of claim 1, wherein at least a diluent is added to at least one of the metal precursors to form the precipitate, and wherein the diluent is selected from the group of titania, sodium silicate, potassium silicate, silica gels, silica sols, silica gels, hydronium- or ammonium-stabilized silica sols, sodium aluminate, potassium aluminate, aluminum sulfate, aluminum nitrate, magnesium aluminosilicate clay, magnesium metal, magnesium hydroxide, magnesium halides, magnesium sulfate, magnesium nitrate, zirconia, cationic clay, anionic clays, and combinations thereof.

15. The method of claim 1, wherein at least a diluent is added to the precipitate, either before or after the removal of at least 50% liquid, and wherein the diluent is selected from the group of zinc oxide; zinc sulfide; niobia; tetraethyl orthosilicate; silicic acid; titania; sodium silicate, potassium silicate, silica gels, silica sols, silica gels, hydronium- or ammonium-stabilized silica sols, sodium aluminate, potassium aluminate, aluminum sulfate, aluminum nitrate, magnesium aluminosilicate clay, magnesium metal, magnesium hydroxide, magnesium halides, magnesium sulfate, magnesium nitrate, zirconia, cationic clay, anionic clays, and combinations thereof.

16. The method of claim 1, wherein at least a diluent is added to the precipitate in forming the batch mixture, and wherein the diluent is selected from the group of titania, sodium silicate, potassium silicate, silica gels, silica sols, silica gels, hydronium- or ammonium-stabilized silica sols, sodium aluminate, potassium aluminate, aluminum sulfate, aluminum nitrate, magnesium aluminosilicate clay, magnesium metal, magnesium hydroxide, magnesium halides, magnesium sulfate, magnesium nitrate, zirconia, cationic clay, anionic clays, and combinations thereof.

17. The method of claim 1, wherein at least a ligating agent L is added to at least one of the metal precursors to form the precipitate, and wherein the ligating agent L is selected from carboxylates, carboxylic acids, aldehydes, ketones, aldehydes, hemiacetals, formic acid, acetic acid, propionic acid, maleic acid, malic acid, cluconic acid, fumaric acid, succinic acid, tartaric acid, citric acid, oxalic acid, glyoxylic acid, aspartic acid, alkane sulfonic acids, aryl sulfonic acids, maleate, formate, acetate, propionate, butyrate, pentanoate, hexanoate, dicarboxylate, and combinations thereof.

18. The method of claim 17, wherein L is maleate.

19. The method of claim 1, wherein the shaped catalyst precursor containing rework material formed is of the formula $A_v[(M^P)(OH)_x(L)^n{}_y]_z(M^{VIB}O_4)$, wherein A is at least one of an alkali metal cation, an ammonium, an organic ammonium and a phosphonium cation; $M^P$ is selected from Group VIII, Group IIB, Group IIA, Group IVA and combinations thereof, P is oxidation state with $M^P$ having an oxidation state of +2 or +4; L is at least one organic oxygen-containing ligating agent, $M^{VIB}$ is at least a Group VIB metal, having an oxidation state of +6; $M^P$: $M^{VIB}$ has an atomic ratio of 100:1 to 1:100; $v-2+P*z-x*z+n*y*z=0$; and $0<y\leq-P/n$; $0<x\leq P$; $0<v\leq 2$; $0\leq z$.

20. The method of claim 19, wherein $M^P$ is at least a Group VIII metal, $M^{VIB}$ is selected from molybdenum, tungsten, and combinations thereof, L is at least one of carboxylates, enolates, and combinations thereof.

21. The method of claim 20, wherein $M^{VIB}$ is a mixture of at least two group VIB metals, molybdenum and tungsten.

22. The method of claim 1, further comprising calcining the shaped catalyst precursor containing rework material at a temperature ranging from 350° C. to 750° C. prior to the sulfiding step, wherein the shaped catalyst precursor is converted to an oxide.

23. The method of claim 22, wherein the shaped catalyst precursor containing rework material is of the formula $(X)_b(MO)_c(W)_dO_z$; wherein X is Ni or Co, the molar ratio of b:(c+d) is 0.5/1 to 3/1, the molar ratio of c:d is >0.01/1, and $z=[2b+6(c+d)]/2$.

* * * * *